US006853404B1

(12) United States Patent
Mead et al.

(10) Patent No.: US 6,853,404 B1
(45) Date of Patent: Feb. 8, 2005

(54) ELECTRONIC VIEW CAMERA FOR TRIPOD MOUNTING

(75) Inventors: Carver A. Mead, Cupertino, CA (US); Jeffrey O. Pritchard, San Francisco, CA (US); Richard F. Lyon, Los Altos, CA (US); Peter O. Schmidt, Campbell, CA (US)

(73) Assignee: Foveon, Inc., Santa Clara, CA (US)

( * ) Notice: Subject to any disclaimer, the term of this patent is extended or adjusted under 35 U.S.C. 154(b) by 716 days.

(21) Appl. No.: 09/075,777

(22) Filed: May 11, 1998

(51) Int. Cl.[7] .............................................. H04N 5/225
(52) U.S. Cl. ................................... 348/373; 348/207.1
(58) Field of Search .......................... 248/639; 361/683, 361/679, 680, 681, 682; 348/552, 373, 375, 376, 14.01; 708/105, 109; 312/223.1

(56) References Cited

U.S. PATENT DOCUMENTS

| | | | |
|---|---|---|---|
| 3,940,777 A | | 2/1976 | Komine ...................... 354/197 |
| 4,104,649 A | | 8/1978 | Tanaka et al. ............... 354/289 |
| 4,258,387 A | * | 3/1981 | Lemelson et al. ........ 348/14.01 |
| 4,448,509 A | | 5/1984 | Katsuma et al. ............ 354/286 |
| 4,457,609 A | | 7/1984 | Tomino et al. .............. 354/286 |
| 4,464,034 A | | 8/1984 | Tomino ....................... 354/286 |
| 4,527,879 A | | 7/1985 | Hosoe et al. ................ 354/400 |
| 4,536,071 A | | 8/1985 | Maekawa et al. ........... 354/400 |
| 4,596,454 A | | 6/1986 | Kawai et al. ................ 354/286 |
| 4,603,955 A | | 8/1986 | Haneishi ..................... 354/286 |
| 4,642,700 A | * | 2/1987 | Ohta et al. .................. 358/285 |
| 4,731,665 A | * | 3/1988 | Hashimoto et al. ......... 358/213 |
| 4,830,328 A | * | 5/1989 | Takach, Jr. et al. ......... 361/683 |
| 5,041,858 A | | 8/1991 | Yamamichi et al. ........ 354/286 |
| 5,212,628 A | * | 5/1993 | Bradbury .................... 361/683 |
| 5,392,067 A | * | 2/1995 | Konno et al. ................. 348/72 |
| 5,402,170 A | * | 3/1995 | Parulski et al. ............. 348/376 |
| 5,475,441 A | | 12/1995 | Parulski et al. ............. 348/358 |
| 5,627,616 A | * | 5/1997 | Sergeant et al. .............. 354/81 |
| 5,675,358 A | * | 10/1997 | Bullock et al. .............. 348/552 |
| 5,877,811 A | * | 3/1999 | Iljama et al. ................ 348/375 |
| 5,880,783 A | * | 3/1999 | Ma .............................. 348/373 |
| 5,883,820 A | * | 3/1999 | Ota et al. ................. 364/708.1 |

FOREIGN PATENT DOCUMENTS

| | | | |
|---|---|---|---|
| DE | 4304506 A1 | 2/1993 | .......... H04N/5/225 |
| EP | 0683596 A2 | 11/1995 | ............ H04N/1/21 |
| GB | 2 078 384 A | 1/1982 | ........... G03B/17/14 |

(List continued on next page.)

OTHER PUBLICATIONS

Author Unknown "Phot Argus" pp. 13,14,15,19,20,24,25, 31,32 Nov. 1977.
Compact Ability "Camcorders" pp. 65–66.
Daniel Grotta, et al. "Digital Cameras" PC Magazine pp. 132–173 Feb. 10, 1998.
Photographic Industries "Title Unknown" pp. 56–60 No. 2 Feb. 1977.
Photographic Industries "Title Unknown" vol unknown No. 10 1982.
The PC Zone "The A–to–Z of Digital Imaging" pp. 53–56.

Primary Examiner—Ngoc-Yen Vu
Assistant Examiner—Rashawn N. Tillery
(74) Attorney, Agent, or Firm—Sierra Patent Group, Ltd.

(57) ABSTRACT

An electronic view camera integrates a camera head assembly and laptop computer into a tripod mountable unified structure. The rigid frame, that unifies the camera head and computer, accommodates a choice of laptop type computers from a variety of different manufacturers. The open front, back and side design of the rigid frame permits ready access for electrical connections and for access to removable storage devices, keyboard, and pointing device. The computer LCD acts as a large screen viewfinder for the camera and has the "feel" of a professional type view camera rather than the "feel" of a computer system with a photographic peripheral.

44 Claims, 3 Drawing Sheets

FOREIGN PATENT DOCUMENTS

| | | | | |
|---|---|---|---|---|
| GB | 2 158 957 A | 4/1985 | ........... | G03B/17/14 |
| JP | 54-108628 | 8/1979 | ........... | G03B/7/20 |
| JP | 56-60911 | 5/1981 | ........... | G02B/7/02 |
| JP | 58-72132 | 4/1983 | ........... | G03B/7/20 |
| JP | 58-83824 | 5/1983 | ........... | G03B/7/20 |
| JP | 59-42527 | 3/1984 | ........... | G03B/17/14 |
| JP | 59-152424 | 8/1984 | ............ | G03B/7/20 |
| JP | 59-218412 | 12/1984 | ........... | G02B/7/11 |
| JP | 60-23841 | 2/1985 | ........... | G03B/17/14 |
| JP | 60-53912 | 3/1985 | ............ | G02B/7/11 |
| JP | 08095670 | 4/1996 | ............ | G06F/1/16 |
| JP | 09128091 | 5/1997 | ............ | G06F/1/00 |

\* cited by examiner

PRIOR-ART

PRIOR-ART

ELECTRONIC VIEW CAMERA FOR TRIPOD MOUNTING

FIELD OF INVENTION

The invention relates to the field of electronic or digital cameras and more specifically to tripod mounted view cameras used in professional still photography.

BACKGROUND OF THE INVENTION

A number of electronic cameras have been recently introduced in the retail still picture camera market. These cameras differ from traditional still cameras because they replace conventional photographic film with a reusable electronic photocell array as the image sensor and an electronic or magnetic memory as the storage medium. The photocell array, located at the focal plane of the camera, generates an array of discrete signal values (pixels) that represent the photographic image. The array of discrete signal values represents the light intensity falling on the image plane at the locations of the photocells that make-up the photocell array. The image can be reconstructed by displaying the set of discrete signal values as a raster array of the pixel intensity on a video display or liquid crystal display (LCD) unit.

Most commercial electronic cameras are directed toward the amateur market and are offered at a range of prices that depend on the features provided. For example, the lowest priced versions typically use optical view finders, such as found on conventional cameras, while higher priced units feature LCD (liquid crystal display) view finders that show the camera operator the image generated by the lens in the photocell array. Because consumers generally prefer the convenience of small cameras, electronic camera manufacturers tend to favor small size even at the expense of inconvenience in manipulating the camera controls. Consequently, the control selector knobs tend to be inconveniently small and are used for multiple purposes which makes these knobs less than optimal for professional use.

Generally, some form of electronic or magnetic digital storage is provided for storing one or more images for later viewing. If an LCD screen is provided for view finding, the stored images can be recalled for display on the camera's LCD screen. Optionally, the stored images may be read out electrically to an external device such as a computer for printing or for archival storage.

More elaborate models offer user-selectable operating modes such as a choice in pixel resolution, black-and-white or color, and various levels of image data compression for increasing the image storage capacity within the camera.

The ability to couple electronic cameras to a computer has resulted in some electronic cameras being used tethered to a computer as a computer peripheral. The computer is used for archival storage and for camera operating mode selection. Selectable operating mode options can include selection of resolution, flash control, shutter speed, and lens aperture. Unfortunately, this tethered configuration results in a photo-imaging system that is not very camera-like but is more like a computer system with a photo-imaging peripheral. The system does not provide the operator with the same "feel" as, or the convenience of, a studio camera to which a professional photographer is accustomed.

The limitations imposed on the professional photographer by currently available electronic cameras may be summarized as follows:

1. inconvenient small control knobs often overloaded with multiple functions;
2. expensive when they include video screen viewfinder, large storage capacity, and easily used manual controls;
3. awkward tethering to a computer; and
4. difficult to set-up, configure, maintain, and use, if tethered to a general purpose computer.

It is an object of the current invention to overcome the current state-of-the-art limitations by providing a professional-quality camera with the same ease of use as current tripod-mounted view cameras used by professional photographers. Further, it is an object of the current invention to provide some, or all, of the following attributes:

1. the "feel" of a tripod mountable professional camera, as opposed to a computer peripheral;
2. easy to set-up and use;
3. economically priced by taking advantage of developments in the information processing and camera industries;
4. configuration options that include features such as
   a) electronic camera head accepting interchangeable lens;
   b) camera parameter control for focus, aperture, and exposure time;
   c) LCD view-finder equivalent of ground-glass viewer;
   d) high capacity image storage;
   e) image processing options including tonality and color correction and enhancement, and image data compression;
   f) flexible exposure metering;
   g) external input/output communication channel for image data transfer; and
   h) ability to apply field upgrades through software loading.

BRIEF DESCRIPTIONS OF THE INVENTION

A tripod mountable view camera that is constructed as an integrated unit that includes:

a) a rigid frame, suitable for mounting on a tripod, for holding a camera head and laptop type computer;

b) a camera head assembly including lens and electronic image sensor module attached to the rigid frame so that the lens can be unobstructedly pointed at a subject, the camera head assembly being computer controllable for one or more functions, the camera head assembly also including a communication port for image and control data; and c) a laptop type computer attached to the rigid frame and electrically connected to the camera head assembly communication port for function control and for receiving image data, the laptop type computer screen display selectively operating as an image viewfinder.

The incorporation of a computer with an electronic camera head on a rigid mount provides a unitized apparatus that has the "feel" of a professional view camera while providing the flexibility of a programmable computer for controlling the camera head, economically providing storage for multiple images, communicating with external devices when necessary, and supporting image processing software.

The programmable laptop type computer can programmably assign specific camera function control to single or multiple sequential keystrokes of the keyboard, or to other input devices, for control of such functions as focus, aperture, exposure timing, and zoom. The designation "laptop type computer" or "laptop computer" is used herein to be the generic name for a portable personal computer commonly called a notebook, laptop, subnotebook, pocket, or clamshell computer.

DETAILED DESCRIPTION OF THE INVENTION

Figure 1A:
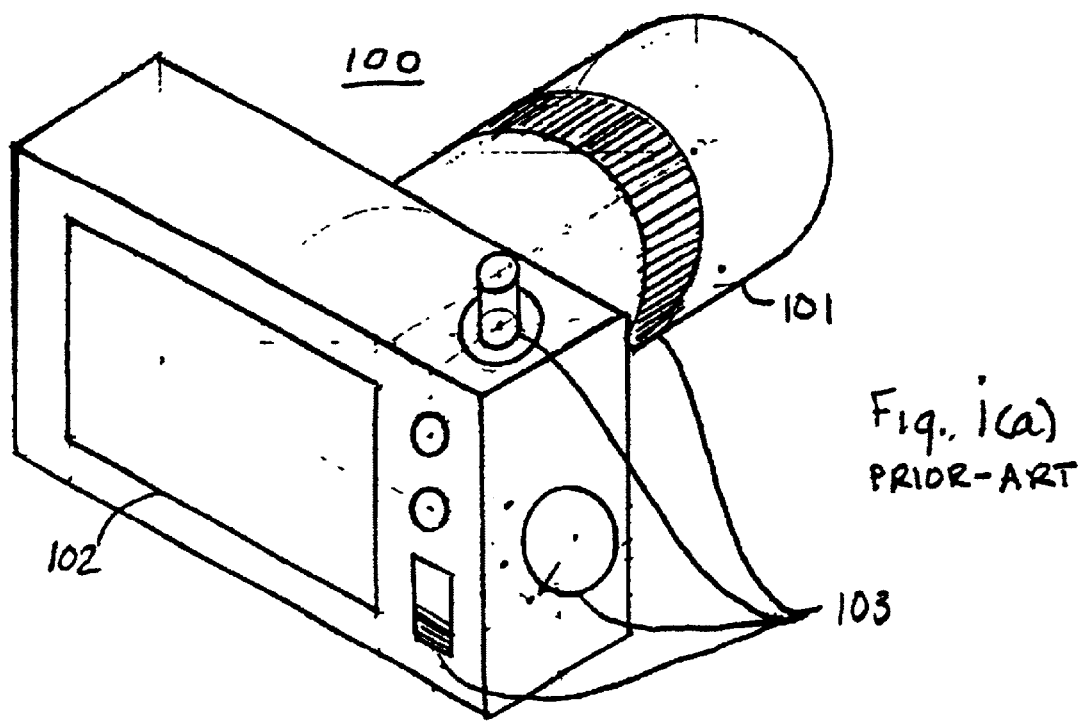
FIG. 1(a) (prior art) shows an external view of a basic electronic camera.
Figure 1B:
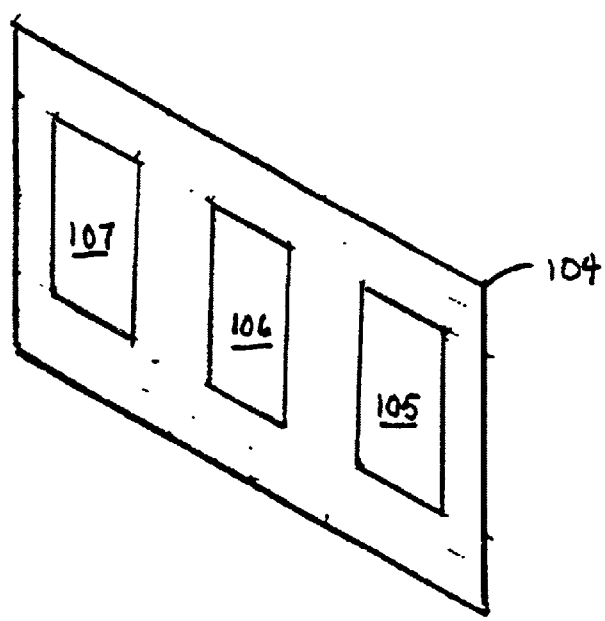
FIG. 1(b) (prior art) shows an electronics assembly of an electronic camera.

FIGS. 1(a) and 1(b) are drawings of a prior-art electronic (or digital) camera 100. FIG. 1(a) is an external view that includes a lens assembly 101 for projecting an in-focus image of a subject onto a photocell array, an LCD view finder 102 for viewing the image captured by lens assembly 101, and external controls 103 for camera operating mode and shutter control. The external controls 103 are used for controlling the lens and for inputting ancillary parameters (such as exposure mode, compression quality, and aperture size).

FIG. 1(b) shows an electronics assembly 104 that is located at the focal plane of camera 100 and includes control electronics 105, storage subsystem 107, and image sensor module 106. Image sensor module 106 typically has at least one CCD or photodiode type pixel sensor array for capturing images as arrays of charges which can be read out as voltage signals. Multiple pixel sensor arrays are used for capturing color images after separating the image by means of a set of filters into a set of color component images (such as red, green, and blue). The length of time for which the pixel array is exposed determines the image signal intensity formed in the pixel array. Either a conventional mechanical shutter controls the exposure time or an electronic shutter controls the amount of time from initialization of the array of pixels to the transfer of the pixel charge to a storage or readout circuit.

Because the pixel charge is sensed as an analog voltage, each pixel voltage is converted to a binary quantized signal representative of the charge for storage, read out, or viewing on LCD viewfinder 102 of FIG. 1(a). However, less expensive units may not include an LCD so that a conventional optical viewfinder is used for picture taking while pictures are displayed or printed on an external device.

It should be recognized that few industry or user standards exist for electronic (digital) cameras so that considerable variation in configurations of current commercially available products exists. In this regard, Computer Buyer's Guide, Hams Publications, Inc., New York N.Y., Spring 1998, p.60, col. 1, para. 2, states: "There are no agreed-upon standards because digital cameras are the newest of PC [personal computer] input devices". This quote is also significant because it shows that the industry's current state-of-mind about the role of electronic cameras is as computer peripheral devices.

Figure 2:
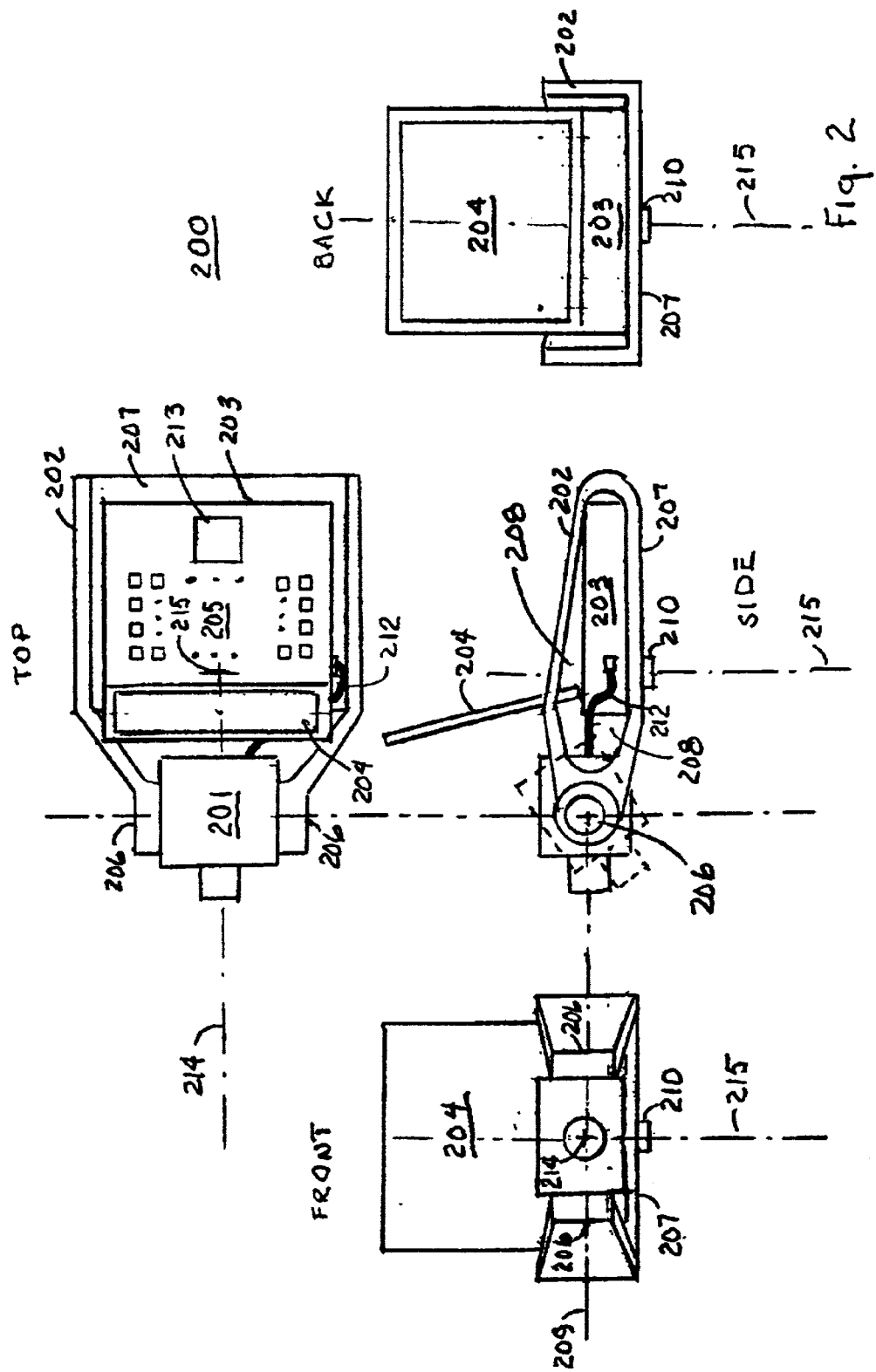
FIG. 2 shows a front, top, back, and side view of the electronic view camera assembly.

It is desirable that an electronic studio (view) camera be made available that allows the professional, and advanced amateur, photographer to operate the electronic camera with the feel of a conventional tripod-mounted studio camera while enjoying all of the benefits of an electronic camera. FIG. 2 shows a four-view drawing of the mechanical configuration of an electronic view camera 200 that satisfies this requirement according to the present invention described below.

Referring to FIG. 2, the top view shows a camera head 201 that holds the lens assembly 211 and houses the image sensor module and associated electronics, a laptop type computer 203, and a rigid mounting frame 202 that holds the camera head 201 and computer 203 as a unified camera assembly. Frame 202 has a bottom plate 207 on which computer 203 is securely affixed. Computer 203 is attached to bottom plate 207 by means of a hook-and-loop fastener but any other reasonable fastener method may be used. All sides of computer 203 are accessible through the openings 208 on the right, left, and front sides of frame 202. Access openings 208 are provided to allow access to any input/output connector terminals on computer 203. The backside of frame 202 allows convenient access to computer keyboard 205 by the photographer for keyboard control of camera 200 and for convenient viewing of computer LCD display 204 from a normal viewing position to the rear of camera 200. The keyboard area 205 can also contain a pointing (or touch-pad) device 213 for selecting menu items displayed on LCD display 204 or for generating camera head 201 control signals. Cable 211 electrically connects camera head 201 and laptop computer 203 for communicating control and image data signals.

Camera head 201 can be rigidly attached to frame 202. However, in the preferred embodiment, the camera head is mounted on swivels 206 that permit the lens to swivel about horizontal axis 209 for permitting the lens to point either upward or downward while computer keyboard 205 and LCD 204 remain conveniently oriented for manual inputs and viewing, respectively.

Openings 208 are provided for all sides of computer 203 so that the frame can accommodate a large variety of laptop computer models, virtually independent of manufacturers and manufacturers' models, and allow for easy access to any input and/or output connectors and for inserting or removing compact disks (CDs), floppy diskettes, or card interface devices such as PCMCIA I/O adapters. Opening 208 between camera head 201 and computer 203 provides space for connecting cable 212 between computer 203 and camera head 201.

When electronic view camera 200 is mounted on a tripod, frame 202 can also be used as a grip for panning the camera in place of the tripod pan bar commonly used for positioning a camera through the degrees of freedom of motion of the tripod head.

A standard camera tripod mount 210 (a screw hole or mounting plate adapter) is included in bottom plate 207 for connecting a tripod to camera 200. Tripod mount 210 is located below the approximate center of mass of camera 200 and along the central axis 214 of lens assembly 211. By aligning tripod mount 210 behind the lens allows the camera to rotate in a manner similar to the familiar view camera when mounted on a tripod, i.e. without additional image shift or parallax that would result from positioning tripod mount 210 off the central axis 214 of lens assembly 211. Preferably, a mounting plate is used that allows a sliding adjustment of the position of the camera on a tripod head to accommodate the variations in the location of the center of mass of different camera configurations (such as when camera head 201 or lens assembly 211 is changed).

Figure 3:
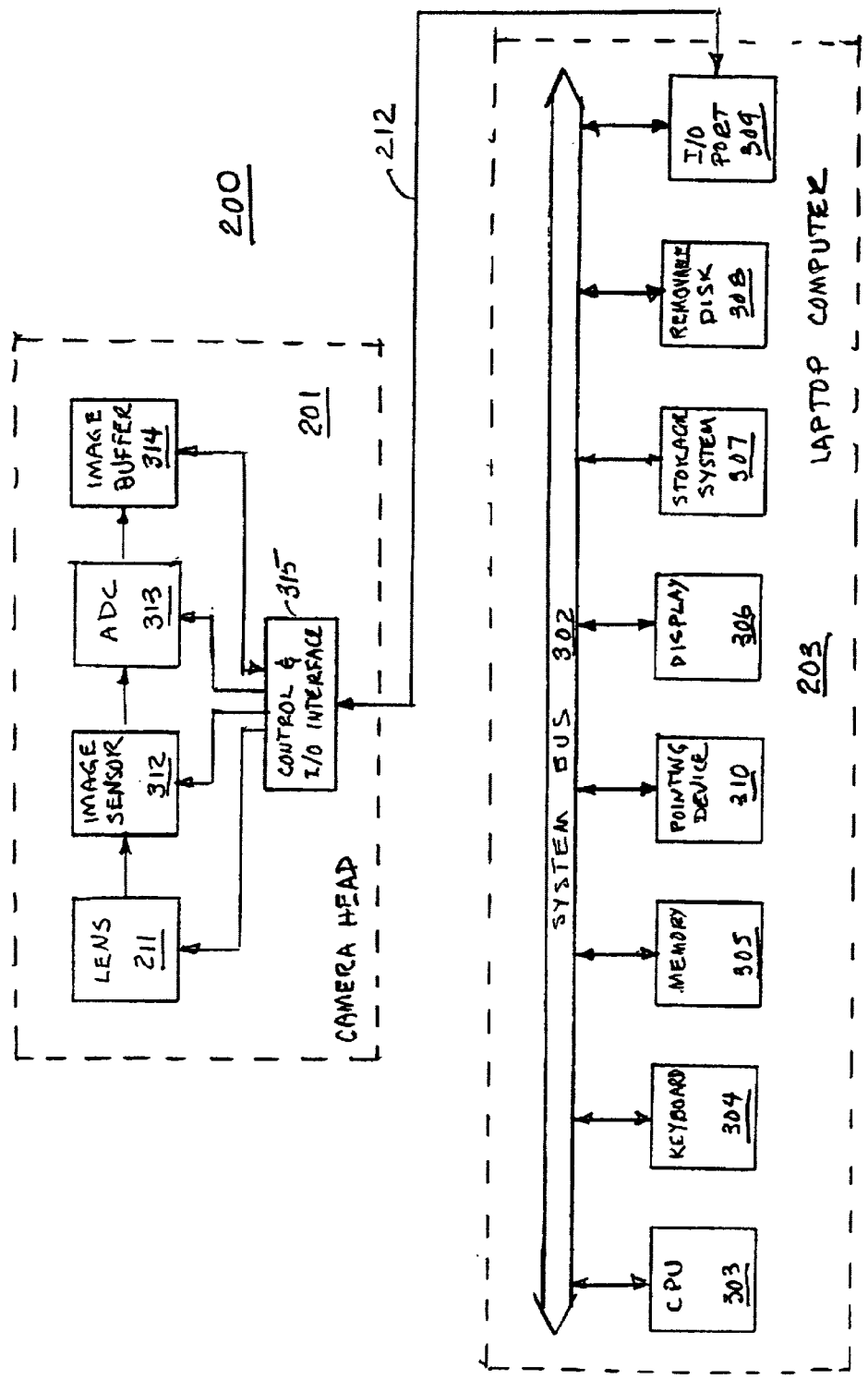
FIG. 3 a system block diagram of the electronic view camera of FIG. 2.

FIG. 3 is a system block diagram of camera 200 and is shown to include camera head 201 with attached lens 211 and laptop computer 203.

Camera head 201 includes: lens assembly 211 which may be electrically or manually controlled; image sensor module 312 with one or more photocell arrays; ADC 313 for converting the analog pixel signals from module 312 into binary quantized values; image data buffer 314 for temporary storage of the quantized image data; and control and I/O interface unit 315 for communicating control signals and image data signals over cable 212 which is connected to computer 203.

Computer 203 is shown as a bus-oriented computer organized around system bus 302 that communicates control and data information between computer subassemblies. Within computer 203, system bus 302 supports CPU 303, memory 305, and display (LCD) 306. In addition system bus 302 also supports input/output (I/O) features such as keyboard 304, pointing device 310, I/O port 309, storage system 307 for bulk storage of software and image data; and removable disk read/write unit 308. The camera elements controllable by computer 203 include: lens assembly 211 for focus, aperture, and zoom control; image sensor module 312 for initialization, exposure, and resolution control; ADC 312 for quantization of pixel data; image buffer 314 for image storage and retrieval.

Software loaded in computer 203 causes camera 200 to operate as an integrated (unified) camera system rather than a computer system with an electronic camera peripheral device. The keyboard function can be customized so that a photographer can, by simple keystrokes, conveniently operate the photographic functions of camera 200 with the feel of a studio view camera.

The computer and its software are preferably preconfigured when the camera is manufactured so that the user sees the product only as a camera. As a result, the user does not need to be involved in other complexities of computer usage, such as installing application software. The camera software preferably hides the underlying operating system from the user while relying on the operating system to provide efficient access to modern hardware capabilities such as the LCD screen and mass storage devices. Building the camera around a computer allows a surprisingly large efficiency advantage during the camera development process because new technologies can be quickly integrated into new versions of the camera with only modest effort. With additional software effort, new features can be added to cameras after they are manufactured and in use. Hence, the apparatus as described above allows for rapid and economical product improvements.

The above description was limited to specific elements and structures for clarity of explanation of the invention. For example, frame 202 of FIG. 2, shown with a particular visual design form, can assume a variety of visual design forms and still perform the function described. Also, a specific common computer architecture was used in the preferred description. However, other well-known computer architectures can be used as will be understood by those skilled in the art. Many other changes in the methods and apparatus described above may be made by the skilled practitioner without departing from the spirit and scope of the invention, which should be limited only as set forth in the claims that follow.

What is claimed is:

1. An electronic view camera apparatus comprising:
a laptop type computer having a display screen, a manual input device, a random access memory, a storage subsystem, and input and output connectors;
a rigid frame structurally configured to mount on a tripod, for securely holding a camera head and the laptop type computer such that the input and output connectors, and the manual input device are accessible; and
a camera head having a lens assembly, an image sensor module, and an externally accessible control and a communication port, the camera head securely mounted on the rigid frame so that the lens assembly can be unobstructedly pointed at a subject; wherein the laptop type computer is securely mounted on the rigid frame so that the display screen can be conveniently viewed when used as a viewfinder, and the laptop type computer is electrically connected to the camera head for control of selected camera head functions and for receiving image sensor data.

2. The apparatus of claim 1 wherein the manual input device includes an alphanumeric keyboard.

3. The apparatus of claim 1 wherein the manual input device includes a pointing device.

4. The apparatus of claim 1 wherein the camera head lens assembly has at least one manually controllable function.

5. The apparatus of claim 1 wherein the camera head can swivel relative to the rigid frame for providing convenient image object viewing.

6. The apparatus of claim 1 wherein the camera head lens assembly has at least one computer controllable function.

7. The apparatus of claim 1 wherein the camera head lens assembly has color filters for producing a set of photocell array images for constructing color images.

8. The apparatus of claim 1 wherein the camera head photocell array has CCD pixel elements.

9. The apparatus of claim 1 wherein the camera head photocell array has photodiode pixel elements.

10. The apparatus of claim 1 wherein the laptop type computer display comprises a liquid crystal display panel.

11. The apparatus of claim 1 wherein the laptop type computer has programmable control of one or more camera head functions.

12. The apparatus of claim 1 wherein the laptop type computer has programmable control of the lens assembly focus function.

13. The apparatus of claim 1 wherein the laptop type computer has programmable control of the lens assembly zoom function.

14. The apparatus of claim 11 wherein the laptop type computer has programmable control of the lens assembly exposure function.

15. The apparatus of claim 1 wherein the laptop type computer has programmable control of the lens assembly aperture function.

16. The apparatus of claim 1 wherein the laptop type computer has a program defined keyboard for keyboard control of selected electronic view camera apparatus functions by assigning selected function control to at least one key of the keyboard.

17. The apparatus of claim 16 wherein the laptop type computer assigns keyboard control for focus control.

18. The apparatus of claim 16 wherein the laptop type computer assigns keyboard control for shutter control.

19. The apparatus of claim 16 wherein the laptop type computer assigns keyboard control for aperture control.

20. The apparatus of claim 1 wherein the rigid frame has a tripod mount that is a slideable mounting plate for accommodating variations in the location of the electronic view camera center of mass and the central axis of the camera head lens assembly lens.

21. An electronic view camera apparatus comprising:
a) a laptop type computer having a display screen, a manual input device, a random access memory, a storage subsystem, and input and output connectors;
b) a camera head having a lens assembly, an image sensor module, and an externally accessible control and a communication port; and c) a rigid frame, having a bottom plate, a front, a rear, and a tripod mount, the rigid frame for holding the camera head and the laptop type computer as a unified camera structure;

wherein the camera head is securely mounted on the front of the rigid frame so that the lens is centrally located and the lens' central axis is aligned from front to rear and the lens can be unobstructedly pointed at a subject, the laptop type computer securely mounted on the bottom plate so that the input and output connectors and the manual input device are accessible, and so that the display screen can be conveniently viewed from the rear when used as a viewfinder, the laptop type computer is electrically connected to the camera head for control of selected camera head functions and for receiving image sensor data, and the tripod mount is on the bottom plate and located below the approximate center of mass of the electronic view apparatus and below the central axis of the lens for parallax reduction.

22. The apparatus of claim 21 wherein the manual input device includes an alphanumeric keyboard.

23. The apparatus of claim 21 wherein the manual input device includes a pointing device.

24. The apparatus of claim 21 wherein the camera head lens assembly has at least one manually controllable function.

25. The apparatus of claim 21 wherein the camera head can swivel relative to the rigid frame for providing convenient image object viewing.

26. The apparatus of claim 21 wherein the camera head lens assembly has at least one computer controllable function.

27. The apparatus of claim 21 wherein the camera head lens assembly has color filters for producing a set of photocell array images for constructing color images.

28. The apparatus of claim 21 wherein the camera head photocell array has CCD pixel elements.

29. The apparatus of claim 21 wherein the camera head photocell array has photodiode pixel elements.

30. The apparatus of claim 21 wherein the laptop type computer display comprises a liquid crystal display panel.

31. The apparatus of claim 21 wherein the laptop type computer has programmable control of one or more camera head functions.

32. The apparatus of claim 31 wherein the laptop type computer has programmable control of the lens assembly focus function.

33. The apparatus of claim 31 wherein the laptop type computer has programmable control of the lens assembly zoom function.

34. The apparatus of claim 31 wherein the laptop type computer has programmable control of the lens assembly exposure function.

35. The apparatus of claim 31 wherein the laptop type computer has programmable control of the lens assembly aperture function.

36. The apparatus of claim 31 wherein the laptop type computer has a program defined keyboard for keyboard control of selected electronic view camera apparatus functions by assigning selected function control to at least one key of the keyboard.

37. The apparatus of claim 36 wherein the laptop type computer assigns keyboard control for focus control.

38. The apparatus of claim 36 wherein the laptop type computer assigns keyboard control for shutter control.

39. The apparatus of claim 36 wherein the laptop type computer assigns keyboard control for aperture control.

40. The apparatus of claim 21 wherein the tripod mount is a slideable mounting plate for accommodating variations in the location of the electronic view camera center of mass and the central axis of the camera head lens assembly lens.

41. A rigid frame for constructing an electronic view camera by mounting a camera head having a lens assembly, an image sensor module, and an externally accessible control and communication port, and by mounting a laptop type computer having a display screen, a manual input device, a random access memory, a storage subsystem, and input and output connectors, the rigid frame allowing electrical cable access to the camera head and laptop type computer, unobstructed view by the lens of an image subject, and convenient view of the laptop type computer display when used as a viewfinder, the rigid frame comprising:

a) a bottom plate for attaching and supporting a laptop computer on its upper surface so that the laptop type computer display is conveniently viewed from the rear of the bottom plate, and cable clearance for connecting a laptop computer to external devices;

b) a camera head support rigidly connected to the front of the bottom plate for supporting a camera head so that the lens assembly is approximately centered and can point forward for an unobstructed view of a subject, and provides manual control access to the camera head and cable clearance for connecting the camera head to a laptop type computer; and c) a tripod mount on the bottom surface of the bottom plate approximately centered and located below an expected center of mass of an assembled electronic view camera for minimizing parallax errors.

42. The rigid frame of claim 41 further comprising a right and a left side rail, each attached to the corresponding right and left side of the bottom plate for use in manipulating the electronic view camera when mounted on a tripod.

43. The rigid frame of claim 41 wherein the tripod mount is a slideable mounting plate for accommodating variations in the location of the electronic view camera center of mass and the central axis of the camera head lens assembly lens.

44. The rigid frame of claim 41 wherein the camera head support has swivel type connectors for attaching a camera head for allowing the camera head lens to be pointed upwards, and downwards while maintaining the bottom plate in a horizontal position.

* * * * *